United States Patent
Schantz

(12)
(10) Patent No.: US 7,732,719 B1
(45) Date of Patent: Jun. 8, 2010

(54) HAND HELD LUGGAGE SCALE CASE CONSTRUCTION

(75) Inventor: Brad L. Schantz, Evanston, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 0 days.

(21) Appl. No.: 12/369,925

(22) Filed: Feb. 12, 2009

(51) Int. Cl.
*G01G 21/28* (2006.01)

(52) U.S. Cl. .................. 177/126; 177/148; 177/238; D10/87

(58) Field of Classification Search .................. 177/126, 177/131, 148, 149, 238; D10/87
See application file for complete search history.

(56) References Cited

U.S. PATENT DOCUMENTS

| | | | | |
|---|---|---|---|---|
| 2,603,474 | A | * | 7/1952 | Mandolf et al. ............. 177/233 |
| 2,750,184 | A | * | 6/1956 | Warndahl .................... 177/127 |
| 4,936,399 | A | | 6/1990 | Christman et al. |
| 5,031,710 | A | * | 7/1991 | Parker et al. ........... 177/210 FP |
| 6,608,261 | B2 | * | 8/2003 | Thadani ....................... 177/126 |
| 6,696,650 | B2 | * | 2/2004 | Muller et al. ................ 177/148 |
| D502,657 | S | * | 3/2005 | Liao ............................ D10/89 |
| D526,918 | S | * | 8/2006 | Barmes et al. ............... D10/89 |
| 7,173,197 | B1 | * | 2/2007 | Kasperek .................... 177/131 |
| 7,232,961 | B1 | | 6/2007 | Godshaw |
| 7,238,895 | B2 | | 7/2007 | Dittrich et al. |
| D555,183 | S | * | 11/2007 | Kasperek .................... D16/219 |
| D575,178 | S | * | 8/2008 | Thybulle ..................... D10/89 |
| D575,179 | S | * | 8/2008 | Thybulle ..................... D10/89 |
| 7,408,125 | B2 | * | 8/2008 | Lentine ....................... 177/148 |
| 7,501,591 | B1 | * | 3/2009 | Muniz et al. ................ 177/131 |
| D592,983 | S | * | 5/2009 | Schantz ....................... D10/89 |
| D605,063 | S | * | 12/2009 | Rogers ........................ D10/89 |
| 7,645,949 | B1 | * | 1/2010 | Thompson .................. 177/126 |
| 2004/0007396 | A1 | | 1/2004 | Muller et al. |
| 2007/0045010 | A1 | * | 3/2007 | Kasperek .................... 177/148 |
| 2007/0045011 | A1 | | 3/2007 | Dittrich et al. |
| 2008/0251298 | A1 | | 10/2008 | Kritzler |
| 2009/0057037 | A1 | * | 3/2009 | Muniz et al. ................ 177/131 |

OTHER PUBLICATIONS

Retrieved on Jan. 20, 2009 from the website http:///www.balanzza.com/store/index.html, Balanzza Digital Luggage Scale, Code BZ-100 New Balanzza Ergo, Code BZ200B.
Retrieved on Jan. 20, 2009 from the website http://www.design-go.com/en/detail_39057.html, Digital Luggage Scale, Product Ref. 2005.
Retrieved on Jan. 20, 2009 from the website http://home-solutions.hsn.com/joy-mangano-pack-a-weigh-digital-portable-luggage-scale_p-3582445_xp.aspx, Joy Mangano Pack a Weigh Digital Portable Luggage Scale.
Retrieved on Jan. 20, 2009 from the website http://www.ourweigh.co.uk/digital-angling-scales/dalman-luggage-scale.html, Dalman Electronic Luggage Scale, Model DLS.

(Continued)

*Primary Examiner*—Randy W Gibson
(74) *Attorney, Agent, or Firm*—Fitch, Even, Tabin & Flannery

(57) ABSTRACT

A hand held luggage scale case is comprised of a generally pentagonal pair of shells which fit compatibly together and include a storage chamber section for weight sensing elements as well as a tape measure. The case includes a recess channel molded into the shell to retain a weight measurement hook.

9 Claims, 3 Drawing Sheets

OTHER PUBLICATIONS

Retrieved on Jan. 20, 2009 from the website http://www.dickssportinggoods.com/product/index.jsp?productId=1672137, Berkley 30# Digital Lip Grip Scale, Item No. 1672137.

Retrieved on Jan. 20, 2009 from the website http://shop.heys.ca/ProductDetails.asp?ProductCode=xscale; xScale®.

Retrieved on Jan. 20, 2009 from the website http://www.nametapesdirect.com/scales/scales_01.asp,Permark Digital Luggage Scale.

Retrieved on Jan. 20, 2009 from the website http://www.sourcingmap.com/portable-10kg-fishing-luggage-postal-digital-hanging-scale-p-16739.html, Portable 10KG LB Fishing Luggage Postal Digital Hanging Scale, Item No. a08022900ux0010.

Retrieved on Jan. 20, 2009 from the website http://www.sourcingmap.com/portable-fishing-luggage-digital-hanging-scale-with-hook-p-24588.html, Portable Fishing Luggage Ditigal Hanging Scale with Hook, Item No. a08072600ux0037.

Retrieved on Jan. 20, 2009 from the website http://www.tripneeds.com/salter-digital-luggage-weighing-scales-p-389.html, Salter Digital Luggage Weighing Scales, No. 9500SVDR.

Retrieved on Jan. 20, 2009 from the website http://www.berkley-fishing.com/prod.php?k=79557&sk=79557&u=CFS50MT, Berkley® Classics 50LB Digital Scale & Microfiber Towel Combo, Model No. CFS50MT (1140092).

Retrieved on Jan. 20, 2009 from the website http://www.berkley-fishing.com/prod.php?k=79557&sk=79557&u=TDS#zoom-/dimg/f7102506bdcd8f3f8908a09228c74f25.jpg,Berkley® TEC™, Model No. TDS35 (1131061).

Retrieved on Jan. 20, 2009 from the website http://www.berkley-fishing.com/prod.php?k=79557&sk=79557&u=SCALES#zoom-/dimg/ec9ffe1b9b2bcbb6d55c5a8d0f79b777.jpg, Berkley®, Digital Fish Scale, Model No. FS50 (1102952).

Retrieved on Jan. 20, 2009 from the website http://www.rapala.com/products/accessoriesdetail.cfm?name=15%20and%2050%20lb%20Digital%20Scales&category=Tool%20Series, 15 & 50 lb. Digital Scales, Model Nos. RGSDS-15 and RGSDS-50.

Retrieved on Jan. 20, 2009 from the website http://www.rapala.com/products/accessoriesdetail.cfm?name=15%20lb%20Mini%20Digital%20Scale&category=Tool%20Series, 15 lb. Mini Digital Scale, Model No. RMDS-15; 50lb. Mini Digital Scale, Model No. RMDS-50.

Retrieved on Jan. 20, 2009 from the website http://www.rapala.com/products/accessoriesdetail.cfm?name=50%20lb%20Digital%20Scale&category=Tool%20Series, 50lb. Digital Scale, Model No. RSDS-50; Retrieved on Jan. 20, 2009 from the website http://www.rapala.com/products/accessoriesdetail.cfm?name=Lock%20'n%20Grip%20with%2025%20lb%20Digital%20Scale&category=ProGuide%20Lock%20'n%20Weight%20Series, Lock'n. Grip™ with 25 lb. Digital Scale, Model No. PGLGD.

Retrieved on Jan. 20, 2009 from the website http://www.dickssportinggoods.com/product/index.jsp?productId=2099619, Xtools gripNweigh Floating Digital Fish Scale, Item No. 2099619.

Retrieved on Nov. 25, 2008 from the website http://www.veit.cz/bat1.html, Poultry Scale Bat1.

Eagle Claw Classic Accessories, p. 58, 50 lb. Digital Scale, part No. 04070-002; 50 lb. Tape Measure & Dial Scale, part No. 04070-003; 55 lb. Precision T-Handle Scale, Part No. 04070-004.

\* cited by examiner

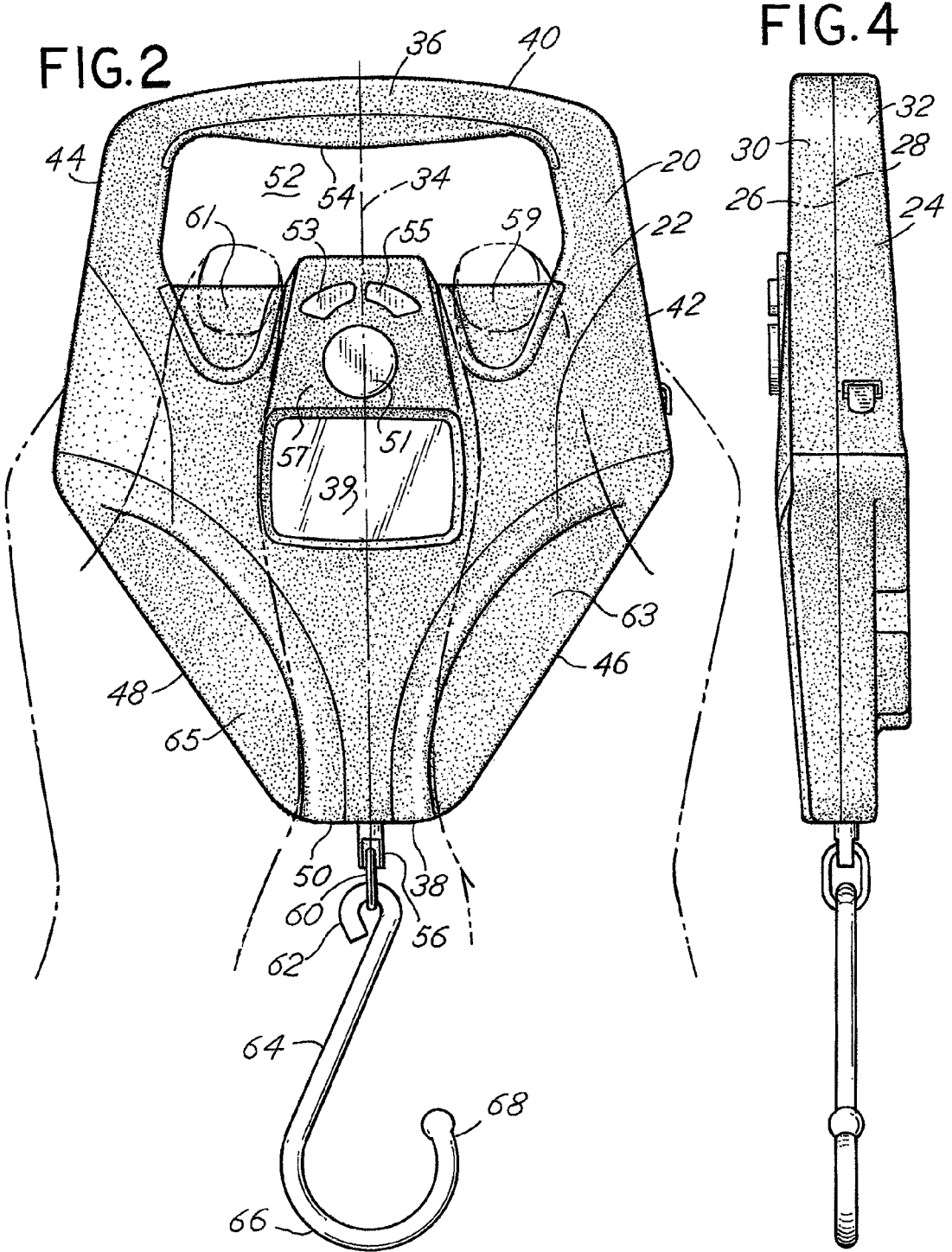

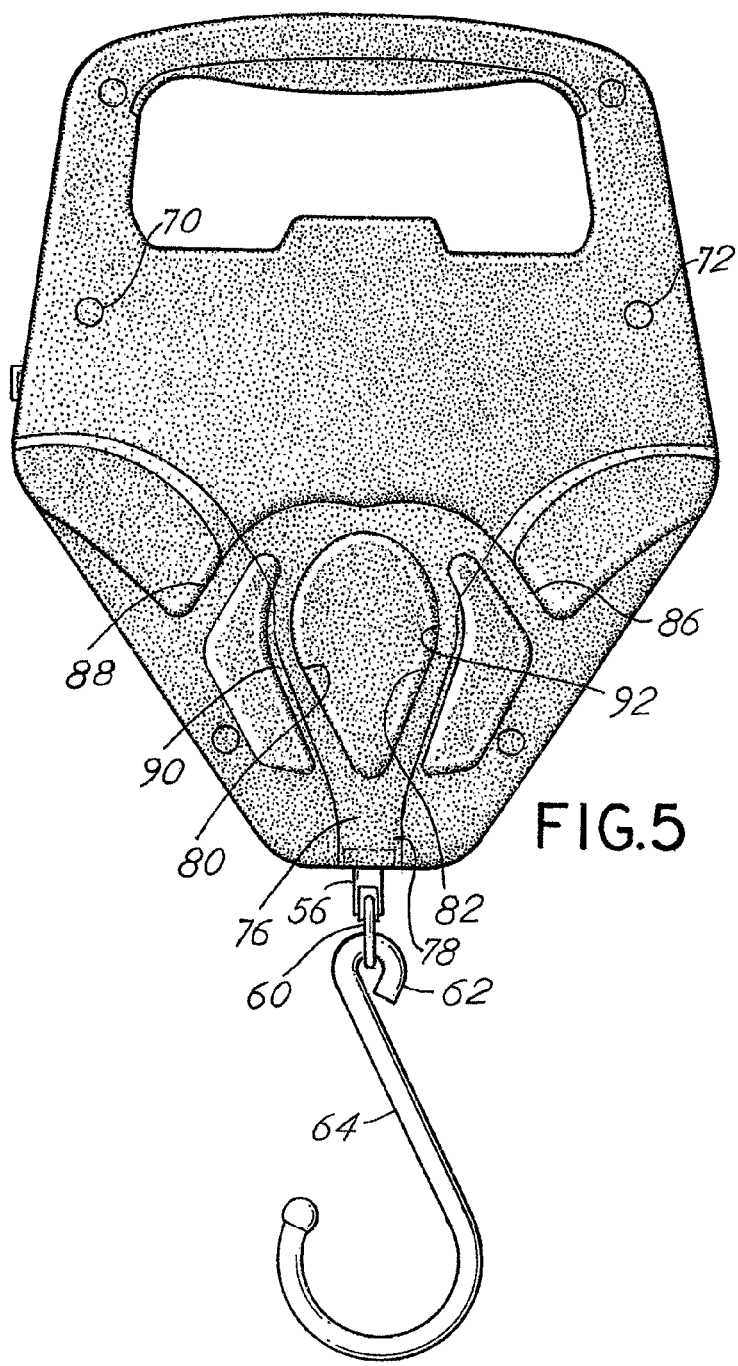
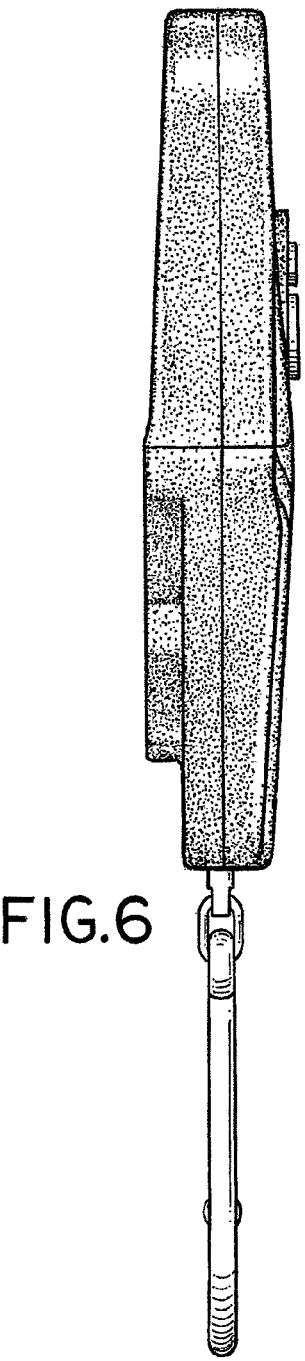
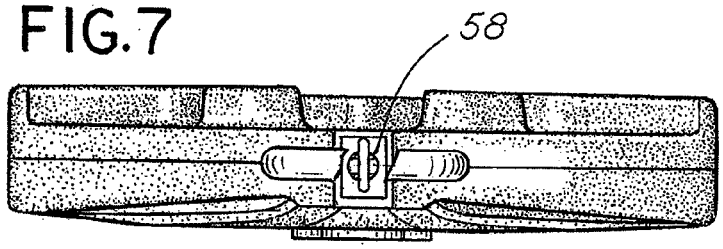
FIG. 5
FIG. 6
FIG. 7

HAND HELD LUGGAGE SCALE CASE CONSTRUCTION

BACKGROUND OF THE INVENTION

In a principal aspect the present invention relates to a hand held luggage scale and, more particularly, to a case for such a scale which is designed to be ergonomical, useful, compact, and easily stored. The hand held luggage scale case of the invention may be utilized in combination with electronic weight measuring technology as well as mechanical weight measuring technology.

With the advent of various travel restrictions particularly air travel restrictions, persons traveling often find it necessary to pack luggage carefully taking into account the weight of luggage inasmuch as transportation service providers typically will charge additional fees for overweight luggage. Additionally, many items which are mailed or shipped often require the sender to take into account the weight of the item being shipped. Thus there has developed the need to provide a compact yet useful weight measurement device of the type which may be hand held and easily transported or stored for use at remote locations such as those locations where a traveler would find themselves.

Various prior art patents and applications disclose scales useful for such purposes. For example, Christman et al. in U.S. Pat. No. 4,936,399 entitled "Hand Held Weighing Scale" issued Jun. 26, 1990 discloses a scale which utilizes an electronic measuring device retained within a case from which a hook is suspended. The item to be weighed is suspended on the hook and its weight is reported on a "read out" window. Dittrich et al. in U.S. Pat. No. 7,238,895 issued Jul. 3, 2007 for a Multi Purpose Digital Scale for Travelers discloses another type of portable scale allowing travelers to calculate the weight of an item which is to be transported. Critzler in U.S. Publication No. 2008/0251298 published Oct. 16, 2008 discloses another version of a portable hand held electronic scale. It is noted that many of these scales utilize electronic measurement sensors although mechanical measurement sensors are also available. A mechanical scale is taught in U.S. Pat. No. 7,232,961 entitled "Portable Hand Held Luggage Weight and Size Measurement Device" issued Jun. 19, 2007. All the references cited are incorporated herein by reference.

While such devices are extremely useful, there has remained a need for an ergonomic, useful and highly compact weight measurement device.

SUMMARY OF THE INVENTION

Briefly, the present invention is directed to a hand held luggage scale case which may incorporate either electronic or mechanical weight measurement sensors and read out mechanisms as well as a size measurement device such as a flexible tape. The case has a generally pentagonal configuration with a front side, a back side, a horizontal, generally planar top side and a bottom side that defines an apex. The top side forms one side of the pentagon. Second and third opposite sides extend downwardly from the top side and diverge slightly therefrom to form two additional sides of the generally pentagonal form. Fourth and fifth sides of the pentagonal form join to the second and third sides, respectively and converge to join the bottom side or apex of the case wherein an opening is provided for a support rod or element attached to the weight sensing and measuring mechanism retained within the case. The fourth and fifth sides of the pentagon are smoothly joined at the bottom side or apex which is a short surface that is generally parallel to the first or top side of the case. The case is a molded case which is formed from two molded shells in opposed relation to form an internal chamber and that include generally congruent sides and which join together along opposing peripheral edges. The edges are congruent to enable the joined shells to form the interior chamber which house the weight sensing mechanism and a measuring tape.

A hand opening or hand holding passage is arranged along and parallel to the top side of the case. The hand opening is generally rectangular and transverse to a vertical, longitudinal axis of the case that extends along a medial line from the top side to the bottom side of the case. The case is designed to be symmetrical about the medial line or longitudinal axis. A weight "read out" window is positioned substantially at the midpoint of the medial line or axis below the hand grip passage. Control buttons are arranged symmetrically along the medial line beneath the hand passage above the read out window and are bounded on each side by detents or recesses in the front side of the case designed to enable the user of the scale to grip the scale using their thumbs positioned within the detents or recesses. Along the fourth and fifth sides of the pentagonally shaped case arcuate recesses are provided in the top side of the shell for receipt of the palms of an individual holding the scale with both hands. The combination of the arcuate recesses for the palms associated with the top side of the case and the detents for thumbs enables a user to lift the scale and luggage supported thereon using both hands to thereby enhance the ergonomic utility of the scale while easily viewing the "read out" window.

A hook is supported on an articulated connection or link at the bottom side or apex of the case. The hook is thus linked to the support rod or element and may be pivoted about the link in a manner which enables the hook to be folded and retained in an array of recess channels molded into the backside shell of the luggage scale case. Thus, the hook element may be easily stored and protected by impressing it into a compatible storage channel on the outside surface of the backside shell of the case. A tape measure may be incorporated within the interior of the shell of the case and retracted therefrom through one of the second or third lateral sides of the case.

Thus it is an object of the invention to provide an ergonomic, hand held luggage scale case useful for measurement weight and dimensions of luggage.

It is a further object of the invention to provide a light weight yet rugged inexpensive and easily used hand held luggage scale device.

Another object of the invention is to provide a luggage scale device which is compact and which includes a luggage support hook which may be easily folded or integrated into the luggage scale case for protective storage.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 2 is a front side elevation of the case of FIG. 1;

FIG. 3 is a top plan view of the scale of FIG. 2;

FIG. 4 is a right hand side view or elevation of the case of FIG. 2;

FIG. 5 is a backside elevation of the case of FIG. 2;

FIG. 6 is a left side elevation of the case of FIG. 2; and FIG. 7 is a bottom side view of the case of FIG. 2.

DESCRIPTION OF AN EMBODIMENT OF THE INVENTION

Figure 1:
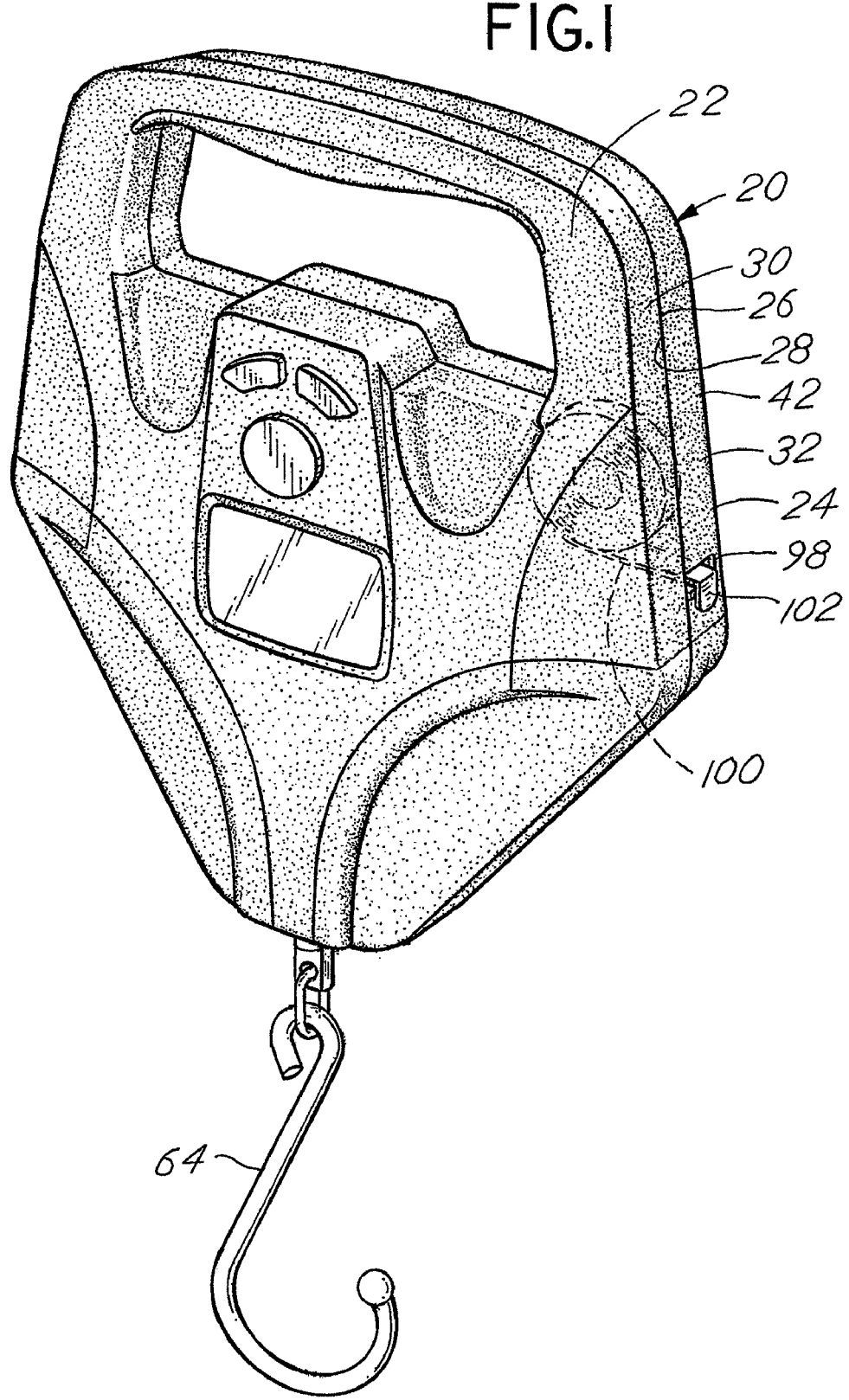
FIG. 1 is a front side isometric view of an embodiment of the luggage scale case of the invention.

Referring to the figures, the luggage scale case 20 of the invention includes a molded front side shell 22 and a compatible molded backside shell 24. The shells 22 and 24 are integral, that is, single molded elements, though they may comprise multiple sections joined together to provide the form of the described case 20. Thus, typically, each shell is molded as a single component and each shell includes a peripheral edge 26 and 28, respectively, which enables the shells 22, 24 to be joined together along their peripheral edges 26, 28. The separate shells 22, 24 each include or define a generally closed loop, peripheral surface or side 30 and 32, respectively, which when the component edges 26 and 28 are joined form an internal chamber. The internal chamber provides the volume in which a weight sensing read out mechanism, for example, of the type disclosed in any of the references cited heretofore may be incorporated. Thus a mechanical measurement device or an electronic measurement device may be incorporated. With contemporary hand held weight measurement constructions, the electronic version is typically more likely and/or more popular.

The assembled case 20 includes a longitudinal axis of symmetry 34 which extends from a top side end 36 to a bottom side end 38. Thus the front side shell 22 and the backside shell 24 are molded and symmetrical respectively about the axis of symmetry 34. The front side shell 22 includes a read out window 39 which is located on axis 34 substantially at the midpoint of the distance between the extreme ends 36, 38 of the longitudinal axis 34. The case 20 includes a first top lateral side or run 40 which is joined to second and third lateral sides 42 and 44 respectively that diverge slightly outwardly from top lateral side 40. The diverging lateral sides 42 and 44 are connected respectively to converging fourth and fifth lower end lateral sides or surfaces 46 and 48 which connect at an apex region to a short linking surface 50. The case 20 thus has a generally pentagonal shape with generally smooth connecting arcuate surfaces joining each of the respective generally flat planar lateral sides forming the pentagonal shape. The smooth surfaces joining respective linear surfaces such as lateral side 42 and lateral side 46 or lateral side 44 and straight lateral side 48 provide an ergonomically useful shell construction which is easily stored and which may be extremely compact.

The case 20 further includes a generally rectangular opening 52 adjacent the top side 36.

The opening 52 has a lateral dimension between the sides 42 and 44 that is greater than the longitudinal dimension along the axis 34. The passage 52 thus defines a hand hold passage and the top border of the inside of the hand hold passage 52 includes a smoothly curved section 54 which facilitates the ergonomic character of the case 20 to promote ease of gripping with one hand.

Arranged symmetrically on, and on opposite sides of the longitudinal axis 34 on the front side of the front shell 22, are central control buttons of a control panel section 57 including a power start and reset button 51, a button 53 which sets the readings through the view window 39 in appropriate units, such as English units or metric units, and a separate button 55 which provides that the measured weight upon the support hook 64 will be retained for purposes of reading.

Arranged on each side of the central control panel section 57, which includes the buttons 51, 53 and 55 that control the operation of the scale, are thumb detents or depressions 59 and 61, respectively, on opposite sides of the longitudinal axis 34. These depressions or detents 59 and 61 are designed to receive the underside of the thumbs of the left and right hands of an individual as depicted in phantom.

Arcuate recessed sections 63 and 65 on the front side or face of the case or front shell 22 are designed to receive a portion of the palms of an individual; namely, the left and right hand portions below the thumb of an individual. Thus, an individual may place, for example, their right hand thumb into the detent 59 with the palm portion of their thumb placed within the arcuate recess section 63. Similarly, with the left hand of an individual, the individual may place their thumb in the detent 61 with the palm portion placed in the arcuate recess 65. In this manner, an individual may hold the scale with both hands in order to achieve a better balance and steady positioning of the scale while simultaneously being able to observe the read out through the window 39 and manipulate the buttons while holding the scale and a luggage item supported thereby with both hands (see FIG. 2).

The scale device includes a depending element in the form of a rod 56 depending through an opening 58 in the bottom side 50. The rod 56 is connected to a link or loop element 60 that joins to the eye 62 of an arcuate hook 64. The arcuate hook 64 includes a curved section 66 which is generally semi-circular with an end run 68 projecting from the semi-circular arcuate curve section 66.

Referring to FIG. 5, the backside shell 24 may include fasteners such as fasteners 70 and 72 which facilitate connection of the backside shell 24 and the front side shell 22. The backside shell 24 also includes a recessed hook channel 76 made up of a first channel section 78 extending from the bottom side 50 along the longitudinal axis 34 and connecting to diverging second and third arcuate channel sections 80 and 82 which diverge in the opposite sense of one another and are symmetrical about the longitudinal axis 34. The arcuate channels 80 and 82 extend in an arcuate path of at least 160 to 200° and terminate in a straight section such as straight sections 86 and 88. As shown in FIG. 5, the purpose of the hook recess channel 76 is to engage and retain the hook 64 in a storage position. That is the hook 64 is retained and recessed within the channel 76 within either channel 80 or channel 82. Hook 64 is retained therein by a constricted area of each such as the area 90 for channel 80 and 92 for the channel 82 so that the hook 64 will, in essence, snap fit into one of the channels 80, 82. Importantly, the hook 64 is retained within a channel 80 or 82 so that it will not inadvertently catch on some item in an undesirable manner. Thus, when the scale is stored, the hook 64 may be safely placed within the channel 76. Again, this provides for an ergonomic benefit with respect to the storage of the scale case.

Another feature of the invention is depicted by way of example in FIG. 1. There the backside shell 24 is depicted having a slot 98 in the wall 42 for receipt of a tape measure 100. The angled end 102 of measure 100 thus enables the tape measure 100 to be easily accessible. The tape which is retained within the chamber formed by the front side shell 22 and backside shell 24 provides a storage feature for the tape measure which may thus be used to measure the size of luggage that is to be weighed in order to confirm compliance with travel restrictions associated with the sizing of luggage. Again, by placing the tape measure 100 within the chamber defined by the shells 22 and 24 and exposed only through the wall 42, access is insured to the tape 100 in a safe and convenient ergonomically beneficial way. Further, the tape measure 100 is easily stored as was the hook 64 to enhance the compactness and safety of use of the case 20.

The description of the manner in which an item may be held by both hands of an individual as set forth previously and the positioning of the storage of the hook 64, as also discussed previously, have been associated with the front shell 22 and the back side shell 24, respectively. Thus, the hook 64 is stored in appropriate channels molded into the back shell 24 whereas the front shell 22 is molded for gripping by both hands of an individual. However, the molded construction may be reversed without departing from the spirit and scope of the invention.

The compactness of the case 20 is another beneficial characteristic or aspect of the invention. Specifically, because of the choice of pentagonal configuration, the horizontal dimension of the first top side of run 40 is typically in the range of 3 to 4½ inches. This enables the hand opening 52 adjacent the top side 40 to be sized to accommodate, in an ergonomic fashion, a wide variety of hand sizes. The length of the second and third lateral sides 42 and 44 is substantially equal and in the range of 2¾ to 3¾ inches. By providing that the sides 42, 44 diverge, the interior chamber within the case 20 is adequately sized to incorporate weight measurement, instrumentation as well as the tape measure 100. The converging lower end sides 46 and 48 are typically in the range of about 3½ to 4½ inches and the apex or linking surface 50 is generally about 1 inch in length. The choice of dimensions thus enables the formation of a compact, hand held carry case which, because of its configuration and its general symmetry about the vertical longitudinal axis 34, provides adequate internal chamber size for the necessary instrumentation while at the same time providing a rather compact and highly functional device wherein the hook 64 is stored and sharp edges are avoided. This provides an enhanced safety characteristic associated with the design of the case 20.

The specification and claims are intended to be interpreted broadly with respect to the scope and meaning of adjectives, adverbs and prepositions as well as nouns and verb forms. By way of example, though specific claim language may include the word "between", the interpretation of said word shall not be limited to preclude extent of elements beyond boundaries of the example unless specific disclaimer is made or unless by virtue of prosecution the term is to be limited. Articles are also not to be limited and articles such as "a" and "an" shall not be limited to a single item or element unless specifically disclaimed. The examples of the invention should therefore not be interpreted as limiting unless indicated as such.

While there have been set forth a preferred embodiment of the invention, it is to be understood that the invention is to be limited only by the following claims and equivalents thereof.

What is claimed is:

1. A hand held luggage scale comprising:
    a case including a front side shell and a compatible back side shell,
    an interior chamber formed by connecting the front side and back side shells;
    a top side of the case, a bottom side of the case and a longitudinal medial axis between the top side and bottom side extending centrally relative to the front side and back side shells so that the shells are divided in half on either side of the medial axis with said case having a generally symmetrical configuration about the medial axis;
    a weight support linkage passage in the bottom side located generally on the medial axis;
    a link extending through the passage;
    a hook connected to the link for supporting an item to be weighed;
    a hand passage in the case adjacent the top side in the form of a generally rectangular opening in the case having a longer dimension transverse to the longitudinal axis;
    a weight read out window in one of said side shells located on the axis substantially midway between the top side and bottom side; and
    a hook recess channel in the other of the side shells extending from the bottom side, said hook recess channel being configured to receive and hold the hook in two different storage positions each extending up along the other side shell away from the bottom side of the case.

2. The hand held luggage scale of claim 1 wherein in the hook has an articulated connection at one end for attachment to the link depending from the weight support link passage, and further including a generally uniform diameter hook support rod with a uniform semicircular curved section compatible with the recess channel.

3. A hand held luggage scale case comprising:
    an integrally molded case including a front side shell and a compatible back side shell, said shells joined to form a case including peripheral lateral side walls, said side walls congruent, said shells positioned to define an interior chamber with a top side of the case, a bottom side of the case and a longitudinal medial axis between the top side and bottom side, said case having a generally symmetrical configuration about the medial axis;
    a weight support linkage passage in the bottom side located generally on the medial axis;
    a hand passage in the case adjacent the top side in the form of a generally rectangular opening in the case having a longer dimension transverse to the longitudinal axis;
    a weight read out window in one of said side shells located on the axis substantially midway between the top side and bottom side; and
    a hook recess channel molded into the other of the side shells extending from the bottom side, said hook recess channel including a first channel section extending from the bottom side peripheral edge along the medial axis connected to diverging second and third arcuate channel sections, said diverging channel section intersecting on the medial axis and forming an arcuate curve in the range of about 160° to 200°, said diverging channel sections each constricted along at least a portion thereof to frictionally engage and retain an arcuate hook therein,
    wherein the case is comprised of at least five smoothly connected lateral side walls generally in the form of a pentagon, including a generally flat top lateral side wall, two diverging lateral side walls extending from the top lateral side wall and two converging lateral side walls extending respectively from the diverging lateral side walls.

4. A hand held luggage scale case comprising:
    an integrally molded case including a front side shell and a compatible back side shell, said shells joined to form a case including peripheral lateral side walls, said side walls congruent, said shells positioned to define an interior chamber with a top side of the case, a bottom side of the case and a longitudinal medial axis between the top side and bottom side, said case having a generally symmetrical configuration about the medial axis;
    a weight support linkage passage in the bottom side located generally on the medial axis;
    a hand passage in the case adjacent the top side in the form of a generally rectangular opening in the case having a longer dimension transverse to the longitudinal axis;

a weight read out window in one of said side shells located on the axis substantially midway between the top side and bottom side;

a hook recess channel molded into the other of the side shells extending from the bottom side, said hook recess channel including a first channel section extending from the bottom side peripheral edge along the medial axis connected to diverging second and third arcuate channel sections, said diverging channel section intersecting on the medial axis and forming an arcuate curve in the range of about 160° to 200°, said diverging channel sections each constricted along at least a portion thereof to frictionally engage and retain an arcuate hook therein; and first and second detents in the said one of said side shells located respectively symmetrically on the opposite sides of the longitudinal axis and separated from one another by a control panel section, each of said detents configured for receipt of a thumb of an individual.

5. The ease-hand held luggage scale of claim 4 further including a first and a second recess section said sections symmetrically positioned on opposite sides of the longitudinal axis and adjacent the bottom side of the said one side of said shells and generally aligned with the first and second thumb detents respectively.

6. A hand held luggage scale case comprising:

an integrally molded case including a front side shell and a compatible back side shell, said shells joined to form an interior chamber, said case including a top side, a bottom side and a longitudinal medial axis between the top side and bottom side, said case having a generally symmetrical configuration about the medial axis;

a weight support linkage passage in the bottom side located on the medial axis;

a weight read out window in one of said side shells located on the axis substantially midway between the top side and bottom side; and first and second detents in the said one of said side shells located respectively on the opposite sides of the longitudinal axis and separated from one another by a control panel section, each of said detents configured for receipt of a thumb of an individual.

7. The case of claim 6 further including a first and second recess section, said sections symmetrically positioned on opposite sides of the longitudinal axis and adjacent the bottom side of the said one side of said shells and generally aligned with the first and second thumb detents respectively, each of said sections configured for receipt of at least a portion of a palm of a person.

8. The case of claim 6 including a hand passage in the case adjacent the top side in the form of a generally rectangular opening in the case having a longer dimension transverse to the longitudinal axis.

9. The case of claim 6 including a hook recess channel molded into the other of the side shells, said hook recess extending from the bottom side, said hook recess channel including a first channel section extending from the bottom side peripheral edge, along the medial axis and connected to diverging second and third arcuate channel sections, said diverging channel section intersecting on the medial axis and forming an arcuate curve in the range of about 160° to 200° said diverging channel sections each constricted along at least a portion thereof to frictionally engage end and retain an arcuate hook therein.

* * * * *